United States Patent
Fuller et al.

(10) Patent No.: US 6,194,111 B1
(45) Date of Patent: Feb. 27, 2001

(54) CROSSLINKABLE BINDER FOR CHARGE TRANSPORT LAYER OF A PHOTOCONDUCTOR

(75) Inventors: Timothy J. Fuller, Pittsford; Markus R. Silvestri, Fairport; John F. Yanus, Webster; Damodar M. Pai, Fairport; Paul J. De Feo, Sodus Point; Dale S. Renfer; Anthony T. Ward, both of Webster; William W. Limburg, Penfield; Harold F. Hammond, Webster, all of NY (US); Robert W. Nolley, Stamford, CT (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/487,327

(22) Filed: Jan. 19, 2000

Related U.S. Application Data

(63) Continuation-in-part of application No. 09/326,169, filed on Jun. 4, 1999, now Pat. No. 6,117,967.

(51) Int. Cl.$^7$ .................................................. G03G 5/047
(52) U.S. Cl. ............................................. 430/59.6; 430/96
(58) Field of Search ............................... 430/59.6, 58.35, 430/96

(56) References Cited

U.S. PATENT DOCUMENTS

| | | | |
|---|---|---|---|
| 3,121,006 | 2/1964 | Middleton et al. | 430/31 |
| 4,233,384 | 11/1980 | Turner et al. | 430/59 |
| 4,265,990 | 5/1981 | Stolka et al. | 430/59 |
| 4,299,897 | 11/1981 | Stolka et al. | 430/59 |
| 4,306,008 | 12/1981 | Pai et al. | 430/59 |
| 4,346,158 | 8/1982 | Pai et al. | 430/59 |
| 4,439,507 | 3/1984 | Pan et al. | 430/59 |
| 4,464,450 | 8/1984 | Teuscher | 430/59 |
| 4,654,284 | 3/1987 | Yu et al. | 430/141 |
| 5,571,647 | 11/1996 | Mishra et al. | 430/58 |
| 5,571,648 | 11/1996 | Mishra et al. | 430/59 |
| 5,571,649 | 11/1996 | Mishra et al. | 430/59 |
| 5,576,130 | 11/1996 | Yu et al. | 430/58 |
| 5,591,554 | 1/1997 | Mishra et al. | 430/59 |
| 5,643,702 | 7/1997 | Yu | 430/58 |
| 5,874,192 | * 2/1999 | Fuller et al. | 430/59.6 |

* cited by examiner

Primary Examiner—John Goodrow
(74) Attorney, Agent, or Firm—Oliff & Berridge, PLC

(57) ABSTRACT

A crosslinkable charge transport layer material for a photoconductor includes at least one poly(arylene ether alcohol), at least one polyisocyanate crosslinking agent and at least one charge transport material dispersed in a solvent. The crosslinkable charge transport layer material is crosslinked following application of the coating solution to the photoconductor. The photoconductor including such crosslinked charge transport layer exhibits excellent wear resistance so as to have long life, thereby reducing the cost of electrophotographic printing machines employing such photoconductors therein.

20 Claims, 4 Drawing Sheets

CROSSLINKABLE BINDER FOR CHARGE TRANSPORT LAYER OF A PHOTOCONDUCTOR

This application is a continuation-in-part of application Ser. No. 09/326,169 now U.S. Pat. No. 6,117,967 filed Jun. 4, 1999, which application is incorporated herein in its entirety by reference.

BACKGROUND OF THE INVENTION

1. Field of the Invention

This invention relates to a novel crosslinkable, wear resistant binder for a charge transport layer of a photoconductor used in electrophotography. More in particular, the invention relates to a binder for a charge transport layer comprised of one or more poly(arylene ether alcohols) crosslinked with one or more polyisocyanates.

2. Description of Related Art

In the art of electrophotography, an electrophotographic plate comprising a photoconductive insulating layer on a conductive layer is imaged by first uniformly electrostatically charging the surface of the photoconductive insulating layer. The plate is then exposed to a pattern of activating electromagnetic radiation such as light, which selectively dissipates the charge in the illuminated areas of the photoconductive insulating layer while leaving behind an electrostatic latent image in the non-illuminated areas. This electrostatic latent image may then be developed to form a visible image by depositing finely divided electroscopic toner particles on the surface of the photoconductive insulating layer. The resulting visible toner image can be transferred to a suitable receiving member such as paper.

Electrophotographic imaging members are usually multilayered photoconductors that comprise a substrate support, an electrically conductive layer, an optional hole blocking layer, an optional adhesive layer, a charge generating layer, a charge transport layer in either a flexible belt form or a rigid drum configuration. For most multilayered flexible photoconductor belts, an anti-curl layer is usually employed on the back side of the substrate support, opposite to the side carrying the electrically active layers, to achieve the desired photoconductor flatness. One type of multilayered photoconductor comprises a layer of finely divided particles of a photoconductive inorganic compound dispersed in an electrically insulating organic resin binder.

U.S. Pat. No. 4,265,990 discloses a layered photoconductor having separate charge generating (photogenerating) and charge transport layers. A charge generating layer (CGL) is capable of photogenerating holes and injecting the photogenerated holes into a charge transport layer (CTL). The photogenerating layer utilized in multilayered photoconductors include, for example, inorganic photoconductive particles or organic photoconductive particles dispersed in a film forming polymeric binder. Inorganic or organic photoconductive material may be formed as a continuous, homogeneous photogenerating layer.

Examples of photosensitive members having at least two electrically operative layers including a charge generating layer and diamine containing transport layer are disclosed in U.S. Pat. Nos. 4,265,990, 4,233,384, 4,306,008, 4,299,897 and 4,439,507. The disclosures of these patents are incorporated herein in their entirety.

Charge transport layers typically comprise a charge transport material dispersed in a polycarbonate binder such as PCZ 400 manufactured by Mitsubishi Gas Chemical Company, Inc. However, such polycarbonate binders suffer from a fast, nearly catastrophic wear rate of 8 to 9 microns per 100 kilocycles when the photoconductor is charged using a bias charging roll (BCR) to charge the photoconductor and a considerable corotron CTL wear rate of ~2.7 microns per 100 kilocycles when using a corotron to charge the photoconductor.

Wear rate is a significant property in that it limits the life of the photoconductor, and photoconductor replacement in electrostatographic devices such as copiers and printers is very expensive. It is thus very significant to limit wear of the photoconductor so as to achieve a long life photoconductor, particularly with respect to small diameter organic photoconductor drums typically used in copiers and printers. In such small diameter drums, 100 kilocycles translates into as few as 10,000 prints. CTL wear results in a considerable reduction in device sensitivity, which is a major problem in office copiers and printers that typically do not employ exposure control.

There remains a serious need for a photoconductor, particularly an organic photoconductor drum, with a long life of at least 100,000 prints, which translates into approximately a minimum of 1 million photoconductor spin cycles.

SUMMARY OF THE INVENTION

It is therefore an object of the invention to obtain a photoconductor, particularly an organic photoconductor drum, having a long life of at least 100,000 prints, which translates into approximately a minimum of 1 million photoconductor spin cycles.

It is a further object of the present invention to obtain a charge transport layer for a photoconductor having such long life. In addition, it is an object of the invention to develop a charge transport layer having superior BCR and corotron wear resistance.

It is a still further object of the invention to develop such a charge transport layer also having high charge mobility.

It is a still further object of the present invention to obtain a printing machine including a long life photoconductor.

These and other objects are obtained by the present invention, which includes a crosslinkable polymer binder for a charge transport layer of a photoconductor. The binder includes at least one poly(arylene ether alcohol) and at least one polyisocyanate crosslinking agent, which materials are crosslinked following application of a coating solution containing the crosslinkable binder to a photoconductor structure. The coating solution also includes at least one charge transport material therein.

DETAILED DESCRIPTION OF PREFERRED EMBODIMENTS

Figure 1:
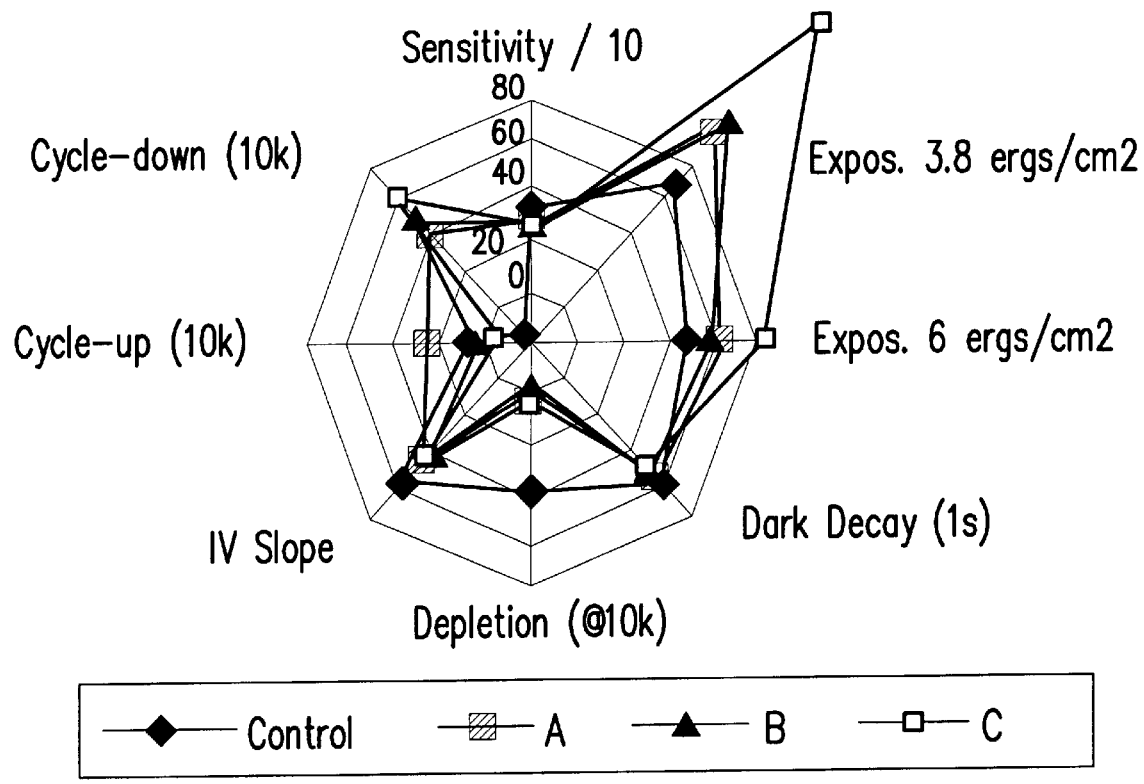
FIG. 1 is a (radar) plot of the electrical properties of photoconductors containing charge transport layers of the invention compared against a control photoconductor.

The crosslinkable charge transport layer material of the invention includes at least one poly(arylene ether alcohol), at least one polyisocyanate crosslinking agent and at least one charge transport material dispersed in a solvent.

The poly(arylene ether alcohol) preferably comprises, for example, polymers of the formulae:

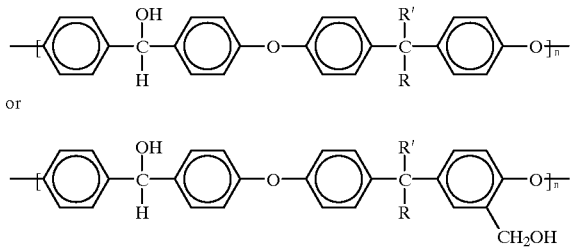

or where R and R' may be the same or different and represent, for example, H (hydrogen), $CH_3$ (methyl), $CF_3$, ethyl, propyl, fluorenoyl, cyclohexyl, and the like, and n may be any integer, preferably ranging from, for example, 25 to 2500, more preferably 40 to 500. Particularly preferred are the polyarylene ether alcohols based on bisphenol A (where R and R' are both methyl) and fluorenone-bisphenol A (with the structure shown below).

The polyisocyanate crosslinking agents preferably comprise, for example, polyisocyanates of the general formula R(NCO)x where x=2 or more, and R represents, for example, alkyl, phenyl, substituted phenyl, and the like.

Preferred polyisocyanate crosstalking agents include, for example, hexane diisocyanate, toluene diisocyanate, isophorone diisocyanate, diphenylmethane diisocyanate, CB-75 (from Mobay, an adduct of toluene diisocyanate with trimethylolpropane), and the like. More preferably, the polyisocyanate includes one or more of hexane diisocyanate and toluene diisocyanate. Most preferably, the polyisocyanate is hexane diisocyanate (HDI).

The polyisocyanates are preferably present in the solution in an amount such that the total amount of polyisocyanates is, for example, 5 to 90 wt. % (based on the weight of the resin), more preferably 5 to 50 mole %, of the total molar amount of alcohol groups of the poly(arylene ether alcohol) present in the solution. Thus, for example, if the coating solution contains 4.7 grams of poly(arylene ether alcohol), the polyisocyanate is preferably present in the solution in an amount ranging from 0.1 to 10 molar excess of diisocyanate groups per molar equivalent weight of the alcohol groups of the polyarylene ether alcohol polymer.

Both the polyisocyanates and the poly(arylene ether alcohol) must be soluble in the solvent used in forming the coating solution for the charge transport layer. Typical solvents used in making conventional charge transport layers (i.e., those employing polycarbonate binders) are preferably used in the solution of the invention. Most preferably, the solvent is tetrahydrofuran (THF), or a mixture of THF with toluene, monochlorobenzene (mCB), or mixtures thereof. The solvent may comprise 10 to 99% by weight of the coating solution. A typical coating solution may be made by adding, for example, about 1.2 grams of polymer, 1.2 grams of transport molecule, and about 7 grams of tetrahydrofuran.

The active charge transport layer must be capable of supporting the injection of photo-generated holes and electrons from a charge generating layer and allowing the transport of these holes or electrons through the organic layer to selectively discharge the surface charge.

The charge transport layer solution thus must also include at least one charge transport material. Any suitable charge transport molecule known in the art may be used, and the charge transport molecules may either be dispersed in the polymer binder or incorporated into the chain of the polymer. Suitable charge transport materials are very well known in the art, and thus are not described in detail herein.

An especially preferred transport layer employed herein comprises from about 25 to about 75 percent by weight of at least one charge transport material and about 75 to about 25 percent by weight of the crosslinkable binder. The crosslinked and dried charge transport layer preferably will contain between about 30 percent and about 70 percent by weight of a small molecule charge transport molecule based on the total weight of the dried charge transport layer.

Preferably, the charge transport material comprises an aromatic amine compound. Most preferably, the charge transport layer comprises an arylamine small molecule dissolved or molecularly dispersed in the binder. Typical aromatic amine compounds include triphenyl amines, bis and poly triarylamines, bis arylamine ethers, bis alkyl-arylamines and the like.

Examples of charge transporting aromatic amines for charge transport layers capable of supporting the injection of photogenerated holes of a charge generating layer and transporting the holes through the charge transport layer include, for example, mTBD, which has the following formula:

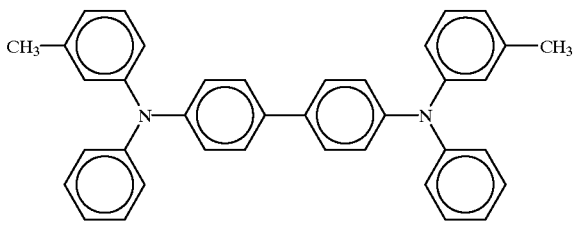

dihydroxybiphenyldiamine (DHTBD), which has the formula:

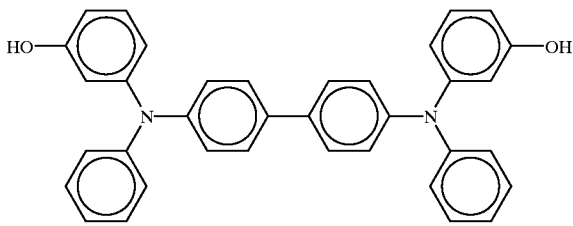

triphenylmethane, bis(4-diethylamine-2-methylphenyl) phenylmethane, 4'-4"-bis(diethylamino)-2',2"-dimethyltriphenylmethane, N,N'-bis(alkylphenyl)-1,1'-biphenyl-4,4'-diamine wherein the alkyl is, for example, methyl, ethyl, propyl, n-butyl, etc., N,N'-diphenyl-N,N'-bis (chlorophenyl)-1,1'-biphenyl-4,4'-diamine, N,N'-diphenyl-N,N'-bis(3"-methylphenyl)-(1,1'-biphenyl)-4,4'-diamine, and the like. mTBD and DHTBD are most preferred.

The foregoing charge transport layer coating solution has a reasonably good potlife on the order of, for example, at least 2 weeks at 25° C.

The charge transport layer solution is applied to the photoconductor. More in particular, the layer is formed upon a previously formed charge generating layer. Any suitable and conventional technique may be utilized to mix and thereafter apply the charge transport layer coating solution to the charge generating layer. Typical application techniques include spraying, dip coating, roll coating, wire wound rod coating, draw bar coating and the like.

Crosslinking of the at least one poly(arylene ether alcohol) with the at least one polyisocyanate and drying of the deposited coating may be effected by any suitable conventional technique such as oven drying, infra red radiation drying, heated air drying and the like. Preferably, heat is used in order to effect crosslinking and evaporation of the solvent, the heating typically comprising, for example, temperatures of at least 100° C. for a period of at least 5 minutes, depending on the thickness of the coating layer. For a coating of about 20 microns, crosslinking and drying may be effected at, for example, 120° C. for 45 minutes.

The crosslinking reaction may be summarized by the following reaction scheme utilizing polybenzophenone-fluomenyl-bisphenol as the poly(arylene ether alcohol) and hexane diisocyanate as the polyisocyanate:

For example, a charge transport layer of the invention has better wear resistance properties at a thickness of 20–21 microns compared to a polycarbonate-based charge transport layer with a thickness of between 25 and 28 micrometers.

The crosslinked charge transport layers of the invention impart a BCR wear resistance of less than 6 microns per 100 kilocycles, particularly about 5.5 microns per 100 kilocycles, which is about half that of conventional charge transport layers employing a polycarbonate binder (which exhibit a BCR wear rate of 8 to 9 microns per 100 kilocycles). The life of a photoconductor is considered to theoretically end when the charge transport layer is worn down to a thickness of 12 microns. As the thickness is worn down during operation (which occurs mainly as a result of BCR charging of the photoconductor in combination with a wiper toner cleaning blade), the sensitivity of the photoconductor decreases. Thus, the wear life of a photoconductor employing the charge transport layer of the invention at a thickness of 25 microns is about ((25 microns–12 microns)× 100 kilocycles)/5.5 microns/100 kilocycles=240 kilocycles.

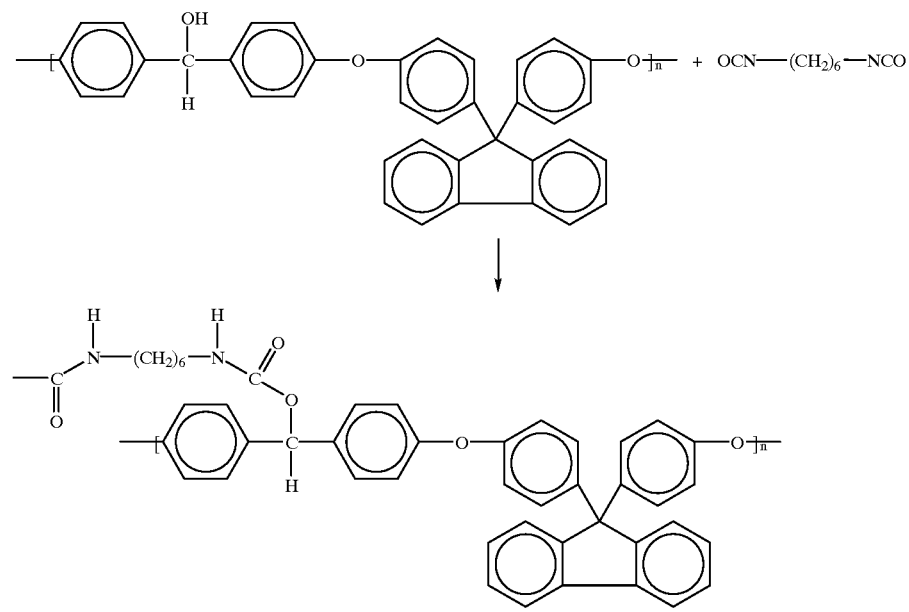

Before crosslinking, the binder (polyarylene ether alcohol) preferably has a weight average molecular weight of from, for example, about 20,000 to about 1,500,000, more preferably of from 50,000 to 150,000. After crosslinking, the polymeric binder is insoluble in the coating solvent.

The crosslinked and dried charge transport layer has a thickness of between, for example, about 15 micrometers and about 45 micrometers. Thicker charge transport layers, which have even higher wear resistance, are obtainable in the present invention because unlike conventional binders used in charge transport layers, the crosslinked binder will not redissolve when an additional application of the coating solution of the charge transport layer is applied. Thicker coatings may also be achieved by increasing the coater pull rate or by increasing the solids in the coating solution.

Of course, an advantage of the present invention is that thinner charge transport layers can be used, achieving a cost savings, while still achieving better wear resistance compared to conventional charge transport layer binder systems.

Increasing the thickness of the charge transport layer further increases the wear life of the photoconductor, for example to 330 kilocycles for a 30 micron thick charge transport layer.

Most preferably, the photoconductor of the invention employing the charge transport layer is in the form of a drum, and most preferably in the form of a small diameter drum of the type used in copiers and printers.

The other layers of the photoconductor will next be explained. It should be emphasized that it is contemplated that the invention covers any photoconductor structure so long as the charge transport layer has the composition described above. Any suitable multilayer photoconductors may be employed in the imaging member of this invention. The charge generating layer and charge transport layer as well as the other layers may be applied in any suitable order to produce either positive or negative charging photoreceptors. For example, the charge generating layer may be applied prior to the charge transport layer, as illustrated in U.S. Pat. No. 4,265,990, or the charge transport layer may be applied prior to the charge generating layer, as illustrated in U.S. Pat. No. 4,346,158, the entire disclosures of these patents being incorporated herein by reference. Most preferably, however, the charge transport layer is employed upon a charge generating layer, and the charge transport layer may optionally be overcoated with an overcoat layer.

A photoconductor of the invention employing the crosslinked charge transport layer may comprise an optional anti-curl layer, a substrate, an optional hole blocking layer, an optional adhesive layer, a charge generating layer, the charge transport layer, and an optional overcoat layer.

The photoconductor substrate may comprise an suitable organic or inorganic material known in the art. The substrate can be formulated entirely of an electrically conductive material, or it can be an insulating material having an electrically conductive surface. The substrate is of an effective thickness, generally up to about 100 mils, and preferably from about 1 to about 50 mils, although the thickness can be outside of this range. The thickness of the substrate layer depends on many factors, including economic and mechanical considerations. Thus, this layer may be of substantial thickness, for example over 100 mils, or of minimal thickness provided that there are no adverse effects on the system. Similarly, the substrate can be either rigid or flexible. In a particularly preferred embodiment, the thickness of this layer is from about 3 mils to about 10 mils. For flexible belt imaging members, preferred substrate thicknesses are from about 65 to about 150 microns, and more preferably from about 75 to about 100 microns for optimum flexibility and minimum stretch when cycled around small diameter rollers of, for example, 19 millimeter diameter.

The substrate can be opaque or substantially transparent and can comprise numerous suitable materials having the desired mechanical properties. The entire substrate can comprise the same material as that in the electrically conductive surface or the electrically conductive surface can be merely a coating on the substrate. Any suitable electrically conductive material can be employed. Typical electrically conductive materials include copper, brass, nickel, zinc, chromium, stainless steel, conductive plastics and rubbers, aluminum, semitransparent aluminum, steel, cadmium, silver, gold, zirconium, niobium, tantalum, vanadium, hafhium, titanium, nickel, chromium, tungsten, molybdenum, paper rendered conductive by the inclusion of a suitable material therein or through conditioning in a humid atmosphere to ensure the presence of sufficient water content to render the material conductive, indium, tin, metal oxides, including tin oxide and indium tin oxide, and the like. The conductive layer can vary in thickness over substantially wide ranges depending on the desired use of the electrophotoconductive member. Generally, the conductive layer ranges in thickness from about 50 Angstroms to many centimeters, although the thickness can be outside of this range. When a flexible electrophotographic imaging member is desired, the thickness of the conductive layer typically is from about 20 Angstroms to about 750 Angstroms, and preferably from about 100 to about 200 Angstroms for an optimum combination of electrical conductivity, flexibility, and light transmission. When the selected substrate comprises a nonconductive base and an electrically conductive layer coated thereon, the substrate can be of any other conventional material, including organic and inorganic materials. Typical substrate materials include insulating non-conducting materials such as various resins known for this purpose including polycarbonates, polyamides, polyurethanes, paper, glass, plastic, polyesters such as Mylar (available from Du Pont) or Melinex 447 (available from ICI Americas, Inc.), and the like. The conductive layer can be coated onto the base layer by any suitable coating technique, such as vacuum deposition or the like. If desired, the substrate can comprise a metallized plastic, such as titanized or aluminized Mylar, wherein the metallized surface is in contact with the photogenerating layer or any other layer situated between the substrate and the photogenerating layer. The coated or uncoated substrate can be flexible or rigid, and can have any number of configurations, such as a plate, a cylindrical drum, a scroll, an endless flexible belt, or the like. The outer surface of the substrate may comprise a metal oxide such as aluminum oxide, nickel oxide, titanium oxide, or the like.

A hole blocking layer may then optionally be applied to the substrate. Generally, electron blocking layers for positively charged photoconductors allow the photogenerated holes in the charge generating layer at the top of the photoconductor to migrate toward the charge (hole) transport layer below and reach the bottom conductive layer during the electrophotographic imaging processes. Thus, an electron blocking layer is normally not expected to block holes in positively charged photoconductors such as photoconductors coated with a charge generating layer over a charge (hole) transport layer. For negatively charged photoconductors, any suitable hole blocking layer capable of forming an electronic barrier to holes between the adjacent photoconductive layer and the underlying zirconium or titanium layer may be utilized. A hole blocking layer may comprise any suitable material. Typical hole blocking layers utilized for the negatively charged photoconductors may include, for example, polyamides such as Luckamide (a nylon-6 type material derived from methoxymethyl-substituted polyamide), hydroxy alkyl methacrylates, nylons, gelatin, hydroxyl alkyl cellulose, organopolyphosphazenes, organosilanes, organotitanates, organozirconates, silicon oxides, zirconium oxides, and the like. Preferably, the hole blocking layer comprises nitrogen containing siloxanes. Typical nitrogen containing siloxanes are prepared from coating solutions containing a hydrolyzed silane. Typical hydrolyzable silanes include 3-aminopropyl triethoxy silane, (N,N'-dimethyl 3-amino) propyl triethoxysilane, N,N-dimethylamino phenyl triethoxy silane, N-phenyl aminopropyl trimethoxy silane, trimethoxy silyl-propyldiethylene triamine and mixtures thereof.

During hydrolysis of the amino silanes described above, the alkoxy groups are replaced with hydroxyl group. An especially preferred blocking layer comprises a reaction product between a hydrolyzed silane and the zirconium and/or titanium oxide layer which inherently forms on the surface of the metal layer when exposed to air after deposition. This combination reduces spots and provides electrical stability at low RH. The imaging member is prepared by depositing on the zirconium and/or titanium oxide layer of a coating of an aqueous solution of the hydrolyzed silane at a pH between about 4 and about 10, drying the reaction product layer to form a siloxane film and applying electrically operative layers, such as a photogenerator layer and a hole transport layer, to the siloxane film.

The blocking layer may be applied by any suitable conventional technique such as spraying, dip coating, draw bar coating, gravure coating, silk screening, air knife coating, reverse roll coating, vacuum deposition, chemical treatment and the like. For convenience in obtaining thin layers, the blocking layers are preferably applied in the form of a dilute solution, with the solvent being removed after deposition of the coating by conventional techniques such as by vacuum, heating and the like. This siloxane coating is described in U.S. Pat. No. 4,464,450 to L. A. Teuscher, the disclosure thereof being incorporated herein in its entirety. After drying, the siloxane reaction product film formed from the hydrolyzed silane contains larger molecules. The reaction product of the hydrolyzed silane may be linear, partially crosslinked, a dimer, a trimer, and the like.

The siloxane blocking layer should be continuous and have a thickness of less than about 0.5 micrometer because greater thicknesses may lead to undesirably high residual voltage. A blocking layer of between about 0.005 micrometer and about 0.3 micrometer (50 Angstroms-3000 Angstroms) is preferred because charge neutralization after the exposure step is facilitated and optimum electrical performance is achieved. A thickness of between about 0.03 micrometer and about 0.06 micrometer is preferred for zirconium and/or titanium oxide layers for optimum electrical behavior and reduced charge deficient spot occurrence and growth.

An adhesive layer may optionally be applied to the hole blocking layer. The adhesive layer may comprise any suitable film fonning polymer. Typical adhesive layer materials include, for example, copolyester resins, polyarylates, polyurethanes, blends of resins, and like.

A preferred copolyester resin is a linear saturated copolyester reaction product of four diacids and ethylene glycol. The molecular structure of this linear saturated copolyester in which the mole ratio of diacid to ethylene glycol in the copolyester is 1:1. The diacids are terephthalic acid, isophthalic acid, adipic acid and azelaic acid. The mole ratio of terephthalic acid to isophthalic acid to adipic acid to azelaic acid is 4:4:1:1. A representative linear saturated copolyester adhesion promoter of this structure is commercially available as Mor-Ester 49,000 (available from Morton International Inc., previously available from duPont de Nemours & Co.). The Mor-Ester 49,000 is a linear saturated copolyester which consists of alternating monomer units of ethylene glycol and four randomly sequenced diacids in the above indicated ratio and has a weight average molecular weight of about 70,000. This linear saturated copolyester has a $T_g$ of about 32° C. Another preferred representative polyester resin is a copolyester resin derived from a diacid selected from the group consisting of terephthalic acid, isophthalic acid, and mixtures thereof and diol selected from the group consisting of ethylene glycol, 2,2-dimethyl propanediol and mixtures thereof; the ratio of diacid to diol being 1:1, where the $T_g$ of the copolyester resin is between about 50° C. and about 80° C. Typical polyester resins are commercially available and include, for example, Vitel PE-100, Vitel PE-200, Vitel PE-200D, and Vitel PE-222, all available from Goodyear Tire and Rubber Co. More specifically, Vitel PE-100 polyester resin is a linear saturated copolyester of two diacids and ethylene glycol where the ratio of diacid to ethylene glycol in this copolyester is 1:1. The diacids are terephthalic acid and isophthalic acid. The ratio of terephthalic acid to isophthalic acid is 3:2. The Vitel PE-100 linear saturated copolyester consists of alternating monomer units of ethylene glycol and two randomly sequenced diacids in the above indicated ratio and has a weight average molecular weight of about 50,000 and a $T_g$ of about 71° C.

Another polyester resin is Vitel PE-200 available from Goodyear Tire & Rubber Co. This polyester resin is a linear saturated copolyester of two diacids and two diols where the ratio of diacid to diol in the copolyester is 1:1. The diacids are terephthalic acid and isophthalic acid. The ratio of terephthalic acid to isophthalic acid is 1.2:1. The two diols are ethylene glycol and 2,2-dimethyl propane diol. The ratio of ethylene glycol to dimethyl propane diol is 1.33:1. The Goodyear PE-200 linear saturated copolyester consists of randomly alternating monomer units of the two diacids and the two diols in the above indicated ratio and has a weight average molecular weight of about 45,000 and a $T_g$ of about 67° C.

The diacids from which the polyester resins of this invention are derived are terephthalic acid, isophthalic acid, adipic acid and/or azelaic acid acids only. Any suitable diol may be used to synthesize the polyester resins employed in the adhesive layer of this invention. Typical diols include, for example, ethylene glycol, 2,2-dimethyl propane diol, butane diol, pentane diol, hexane diol, and the like.

Alternatively, the adhesive interface layer may comprise polyarylate (ARDEL D-100, available from Amoco Performance Products, Inc.), polyurethane or a polymer blend of these polymers with a carbazole polymer. Adhesive layers are well known and described, for example in U.S. Pat. No. 5,571,649, U.S. Pat. No. 5,591,554, U.S. Pat. No. 5,576,130, U.S. Pat. No. 5,571,648, U.S. Pat. No. 5,571,647 and U.S. Pat. No. 5,643,702, the entire disclosures of these patents being incorporated herein by reference.

Any suitable solvent may be used to form an adhesive layer coating solution. Typical solvents include tetrahydrofuran, toluene, hexane, cyclohexane, cyclohexanone, methylene chloride, 1,1,2-trichloroethane, monochlorobenzene, and the like, and mixtures thereof. Any suitable technique may be utilized to apply the adhesive layer coating. Typical coating techniques include extrusion coating, gravure coating, spray coating, wire wound bar coating, and the like. The adhesive layer is applied directly to the charge blocking layer. Thus, the adhesive layer of this invention is in direct contiguous contact with both the underlying charge blocking layer and the overlying charge generating layer to enhance adhesion bonding and to effect ground plane hole injection suppression. Drying of the deposited coating may be effected by any suitable conventional process such as oven drying, infra red radiation drying, air drying and the like. The adhesive layer should be continuous. Satisfactory results are achieved when the adhesive layer has a thickness between about 0.03 micrometer and about 2 micrometers after drying. Preferably, the dried thickness is between about 0.05 micrometer and about 1 micrometer. At thickness of less than about 0.03 micrometer, the adhesion between the charge generating layer and the blocking layer is poor and delamination can occur when the photoconductor belt is transported over small diameter supports such as rollers and curved skid plates. When the thickness of the adhesive layer of this invention is greater than about 2 micrometers, excessive residual charge buildup is observed during extended cycling.

The photogenerating layer may comprise single or multiple layers comprising inorganic or organic compositions and the like. One example of a generator layer is described in U.S. Pat. No. 3,121,006, the disclosure of which is totally incorporated herein by reference, wherein finely divided particles of a photoconductive inorganic compound are dispersed in an electrically insulating organic resin binder. Multiphotogenerating layer compositions may be utilized where a photoconductive layer enhances or reduces the properties of the photogenerating layer.

The charge generating layer of the photoconductor may comprise any suitable photoconductive particle dispersed in a film forming binder. Typical photoconductive particles include, for example, phthalocyanines such as metal free phthalocyanine, copper phthalocyanine, titanyl phthalocyanine, hydroxygallium phthalocyanine, vanadyl phthalocyanine and the like, perylenes such as benzimidazole perylene, trigonal selenium, quinacridones, substituted 2,4-diamino-triazines, polynuclear aromatic quinones, and the like. Especially preferred photoconductive particles include hydroxygallium phthalocyanine, chlorogallium phthalocyanine, benzimidazole perylene and trigonal selenium.

Examples of suitable binders for the photoconductive materials include thermoplastic and thermosetting resins such as polycarbonates, polyesters, including polyethylene terephthalate, polyurethanes, polystyrenes, polybutadienes, polysulfones, polyarylethers, polyarylsulfones, polyethersulfones, polycarbonates, polyethylenes, polypropylenes, polymetlhylpentenes, polyphenylene sulfides, polyvinyl acetates, polyvinylbutyrals, polysiloxanes, polyacrylates, polyvinyl acetals, polyamides, polyimides, amino resins, phenylene oxide resins, terephthalic acid resins, phenoxy resins, epoxy resins, phenolic resins, polystyrene and acrylonitrile copolymers, polyvinylchlorides, polyvinyl alcohols, poly-N-vinylpyrrolidinone)s, vinylchloride and vinyl acetate copolymers, acrylate copolymers, alkyd resins, cellulosic film formers, poly(amideimide), styrene-butadiene copolymers, vinylidenechloride-vinylchloride copolymers, vinylacetate-vinylidenechloride copolymers, styrene-alkyd resins, polyvinylcarbazoles, and the like. These polymers may be block, random or alternating copolymers.

Most preferably, the charge generating layer comprises hydroxygallium phthalocyanine in a polystyrene, polyvinyl pyridine block copolymer binder.

When the photogenerating material is present in a binder material, the photogenerating composition or pigment may be present in the film forming polymer binder compositions in any suitable or desired amounts. For example, from about 10 percent by volume to about 60 percent by volume of the photogenerating pigment may be dispersed in about 40 percent by volume to about 90 percent by volume of the film forming polymer binder composition, and preferably from about 20 percent by volume to about 30 percent by volume of the photogenerating pigment may be dispersed in about 70 percent by volume to about 80 percent by volume of the film forming polymer binder composition. Typically, the photoconductive material is present in the photogenerating layer in an amount of from about 5 to about 80 percent by weight, and preferably from about 25 to about 75 percent by weight, and the binder is present in an amount of from about 20 to about 95 percent by weight, and preferably from about 25 to about 75 percent by weight, although the relative amounts can be outside these ranges.

The particle size of the photoconductive compositions and/or pigments preferably is less than the thickness of the deposited solidified layer, and more preferably is between about 0.01 micron and about 0.5 micron to facilitate better coating uniformity.

The photogenerating layer containing photoconductive compositions and the resinous binder material generally ranges in thickness from about 0.05 micron to about 10 microns or more, preferably being from about 0.1 micron to about 5 microns, and more preferably having a thickness of from about 0.3 micron to about 3 microns, although the thickness can be outside these ranges. The photogenerating layer thickness is related to the relative amounts of photogenerating compound and binder, with the photogenerating material often being present in amounts of from about 5 to about 100 percent by weight. Higher binder content compositions generally require thicker layers for photogeneration. Generally, it is desirable to provide this layer in a thickness sufficient to absorb about 90 percent or more of the incident radiation which is directed upon it in the imagewise or printing exposure step. The maximum thickness of this layer is dependent primarily upon factors such as mechanical considerations, the specific photogenerating compound selected, the thicknesses of the other layers, and whether a flexible photoconductive imaging member is desired.

The photogenerating layer can be applied to underlying layers by any desired or suitable method. Any suitable technique may be utilized to mix and thereafter apply the photogenerating layer coating mixture. Typical application techniques include spraying, dip coating, roll coating, wire wound rod coating, and the like. Drying of the deposited coating may be effected by any suitable technique, such as oven drying, infra red radiation drying, air drying and the like.

Any suitable solvent may be utilized to dissolve the film forming binder. Typical solvents include, for example, tetrahydrofuran, toluene, methylene chloride, monochlorobenzene and the like. Coating dispersions for charge generating layer may be formed by any suitable technique using, for example, attritors, ball mills, Dynomills, paint shakers, homogenizers, microfluidizers, and the like.

Optionally, an overcoat layer can also be utilized to improve resistance of the photoconductor to abrasion. In some cases an anticurl back coating may be applied to the surface of the substrate opposite to that bearing the photoconductive layer to provide flatness and/or abrasion resistance where a web configuration photoreceptor is fabricated. These overcoating and anticurl back coating layers are well known in the art, and can comprise thermoplastic organic polymers or inorganic polymers that are electrically insulating or slightly semiconductive. Overcoatings are continuous and typically have a thickness of less than about 10 microns, although the thickness can be outside this range. The thickness of anticurl backing layers generally is sufficient to balance substantially the total forces of the layer or layers on the opposite side of the substrate layer. An example of an anticurl backing layer is described in U.S. Pat. No. 4,654,284, the disclosure of which is totally incorporated herein by reference. A thickness of from about 70 to about 160 microns is a typical range for flexible photoreceptors, although the thickness can be outside this range.

In a most preferred embodiment of the invention, an overcoat comprised of Luckamide (methoxymethyl-substituted polyamide) crosslinked with oxalic acid is applied to the charge transport layer. Luckamide has the following formula:

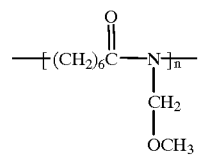

This overcoat has a thickness of at most 3 microns for insulating matrices and at most 6 microns for semiconductive matrices. The use of such an overcoat can still further increase the wear life of the photoconductor, the overcoat having a wear rate of 2–4 microns per 100 kilocycles, or wear lives of between 150 and 300 kilocycles. These values can be added to the wear lives of the CTL discussed above, thereby deriving a photoconductor having a wear life of between, for example, 400 and 500 kilocycles.

The photoconductor of the invention is utilized in an electrophotographic image forming device for use in an electrophotographic imaging process.

The invention will now be described in detail with respect to specific examples thereof. All parts and percentages are by weight unless otherwise indicated.

EXAMPLE 1

A polymer of the formula

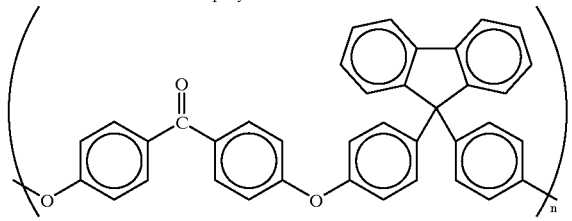

(herein after referred to as poly(4-FPK-FBP)), wherein n is about 130 and represents the number of repeating monomer units, is prepared as follows. A 1-liter, 3-neck round-bottom flask equipped with a Dean-Stark trap (Barrett trap), condenser, mechanical stirrer, argon inlet, and stopper is situated in a silicone oil bath. 4,4'-difluorobenzophenone (Aldrich Chemical Co., Milwaukee, Wis., 43.47 grams, 0.1992 mole), 9,9'-bis(4-hydroxyphenyl)fluorenone (Aldrich, 75.06 grams, 0.2145 mole) potassium carbonate (65.56 grams), anhydrous N,N-dimethylacetamide (300 milliliters), and toluene (52 milliliters) are added to the flask and heated to 175° C. (oil bath temperature) while the volatile toluene component is collected and removed. After 5 hours of heating at 175° C. with continuous stirring, the reaction mixture is allowed to cool to 25° C. The solidified mass is extracted with methylene chloride, filtered and added to methanol to precipitate the polymer, which is collected by filtration, washed with water, and washed with methanol. The yield of vacuum dried product is 71.7 grams.

The polymer is analyzed by gel permeation chromatography with tetrahydrofuran as the elution solvent with the following results: Mn 59,100, Mpeak 144,000, and Mw 136,100. The glass transition temperature of the polymer is 240° C., as determined by using differential scanning calorimetry at a heating rate of 20° C. per minute. Solution cast films from methylene chloride are clear, tough, and flexible. As a result of the stoichiometries used in the reaction, it is believed that this polymer has hydroxyl end groups derived from fluorenone-bisphenol.

EXAMPLE 2

A polymer of the structure

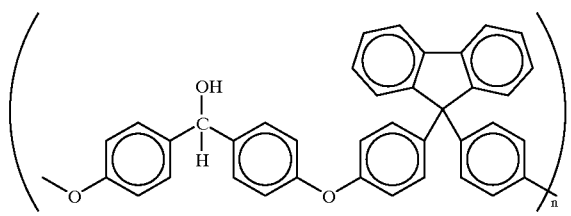

is made as follows. A 1-liter, 3-neck round-bottom flask equipped with a condenser, mechanical stirrer, argon inlet, and rubber septum is situated in a silicone oil bath. Poly(4-FPK-FBP) (10 grams, made as described in Example 1) in tetrahydrofuran (200 grams) is added, followed by 1 molar borane-tetrahydrofuran complex (Aldrich Chemical Co., Milwaukee, Wis., 83.5 grams). The resultant solution gels. After refluxing the gel with mechanical stirring for 2 hours, the reaction mixture is allowed to cool and remain at 25° C. for 16 hours. Methanol is cautiously added drop-wise to react with residual borane. The solid residue is filtered off, washed with water, and then vacuum dried. Tetrahydrofuran (300 milliliters) is added to the solid which did not dissolve until acetic acid (20 milliliters) is added. The solution (in portions of 25 milliliters) is added to water (750 milliliters for each 25 mL portion of polymer solution) using a Waring blender to precipitate a white polymer. The polymer is filtered, washed extensively with water, filtered, washed with methanol, filtered, and then vacuum dried.

The polymer dissolves in tetrahydrofuran but is insoluble in methylene chloride, ethyl acetate, toluene, and methyl isobutyl ketone. When dissolved in tetrahydrofuran (8.5 grams), the hydroxylated polymer (1.2 grams) with N,N'-diphenyl-N,N'-bis(3"-methylphenyl)-(1,1'-biphenyl)-4,4'-diamine) (1.2 grams) is used to coat 25 micron charge (hole) transport layers for organic photoreceptors with hydroxygallium phthalocyanine photogenerator layers. Moreover, the addition of 0.1 gram of hexane diisocyanate to the above coating solution is found to markedly improve the electrical properties of the device.

The above reaction is repeated using 19.7 grams of poly(4-FPK-FBP) in tetrahydrofuran (400 grams) and 1 molar borane-tetrahydrofuran complex in tetrahydrofuran (215 grams). After 2 hours reflux and 16 hours at 25° C., the reaction mixture is cautiously treated with methanol and then acetic acid, followed by addition to water to precipitate the polymer. The polymer is filtered, washed water and then methanol, and then is vacuum dried.

EXAMPLE 3

Chloromethylation of Poly(4-FPK-FBP)

A polymer of the structure

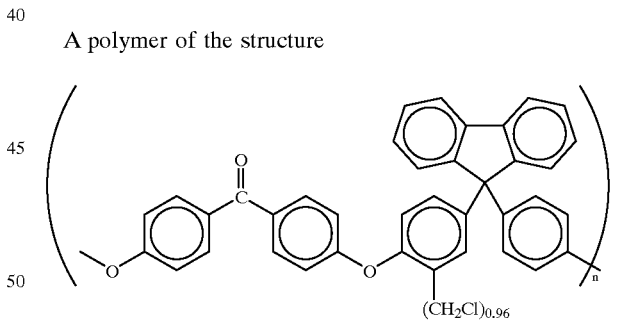

is made as follows. To a 5-liter 3-neck round-bottom flask equipped with a mechanical stirrer, reflux condenser, argon inlet and stopper that is situated in a silicone oil bath are added sequentially, acetyl chloride (388 grams, 320 milliliters), dimethoxyrnethane (450 milliliters), methanol (12.5 milliliters), tetrachloroethane (500 milliliters), and poly(4-FPK-FBP) (100 grams, made as described in Example 1) in tetrachloroethane (1250 milliliters). To this is added tin tetrachloride (5 milliliters) via an air-tight syringe. The reaction mixture is heated for 2 hours at between 90 and 100° C. oil bath set temperature. After cooling to 25° C., the reaction mixture is added to methanol to precipitate the polymer with 0.96 chloromethyl groups per repeat unit.

EXAMPLE 4

Reaction of Chloromethylated Poly(4-FPK-FBPA) with Sodium Acetate

A polymer of the structure

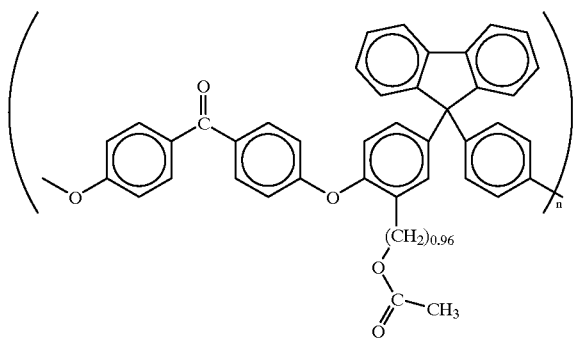

is made as follows. Chloromethylated poly(4-FPK-FBP) (from Example 3 above, 78.5 grams) in N,N-dimethylacetamide (1967 grams) is added to a 5-liter, 3-neck, round-bottom flask situated in a silicone oil bath and equipped with a mechanical stirrer, argon inlet and condenser. Sodium acetate (78.5 grams) is added and the reaction mixture is heated for 24 hours at 100° C. The reaction solution is added to water to precipitate the polymer product which was filtered and washed with methanol. Alternatively, the same polymer is made by magnetically stirring chloromethylated poly(4-FPK-FBP) (25 grams, from the Example 3 above) in N,N-dimethylacetamide (700 grams) with sodium acetate (15 grams, Aldrich) for one month at 25° C. The reaction solution is decanted from the insoluble salts that settled on centrifugation and added to methanol to precipitate a white polymer that is filtered, washed with water, then methanol and then vacuum dried. The yield is 12.2 grams).

EXAMPLE 5

A polymer with the structure

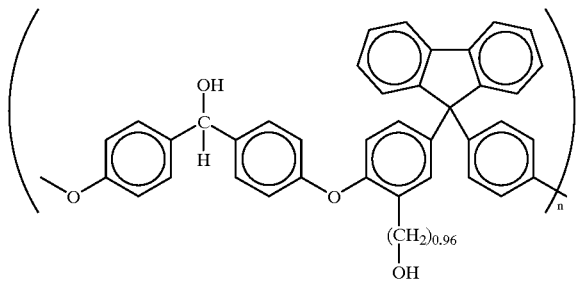

is made as follows. The acetylated polymer (50 grams, of the previous Example 4) in tetrahydrofuran (2000 grams) is allowed to react with 1-molar borane-tetrahydrofuran complex in tetrahydrofuran (250 milliliters, Aldrich) at reflux for 1 hour. The reaction vessel is a 5-liter, 3-neck, round-bottom flask that is situated in a silicone oil bath and equipped with a mechanical stirrer, condenser, argon inlet, and rubber septum. Methanol is added to neutralize unreacted borane and acetic acid is added to form a solution of the polymer. The reaction mixture is added to water to precipitate a white polymer that is filtered, washed with water and then with methanol, and then is vacuum dried. The polymer product dissolved in tetrahydrofuran and in a solution of 1-part ethanol to 9-parts tetrahydrofuran.

EXAMPLE 6

A polymer with the structure

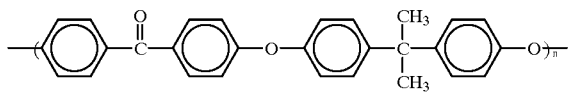

is made as follows. A 5-liter, 3-neck round-bottom flask equipped with a Dean-Stark trap (Barrett trap), condenser, mechanical stirrer, argon inlet, and stopper is situated in a silicone oil bath. 4,4'-dichlorobenzophenone (Aldrich Chemical Co., Milwaukee, Wis., 403.95 grams), bisphenol A (Aldrich, 340.87 grams), potassium carbonate (491.7 grams), anhydrous N,N-dimethylacetamide (2250 milliliters), and toluene (412.5 milliliters, 359.25 grams) are added to the flask and heated to 170° C. (oil bath temperature) while the volatile toluene component is collected and removed. After 48 hours of heating at 170° C. with continuous stirring, the reaction mixture is allowed to cool to 25° C. The reaction mixture is filtered to remove insoluble salts, and the solution is then added to methanol to precipitate the polymer. The polymer is isolated by filtration, washed with water and then methanol, and then is vacuum dried.

EXAMPLE 7

A polymer with the structure

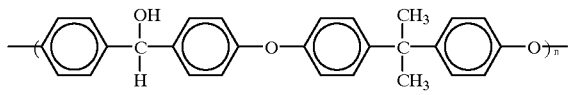

is made as follows. Poly(arylene ether ketone) (of the previous Example 6, 5 grams) in dioxalie (50 milliliters) is treated with 1 molar borane-tetrahydrofuran complex in tetrahydrofuran) (50 milliliters). Heating with stiiring at 70° C. is carried out for about 4 hours. The polymer solution gels at 25° C. within 10 minutes after all the borane solution has been added. Vigorous gas evolution is observed. The polymer is treated with methanol and the polymer dissolved with gas evolution. The reaction mixture is concentrated using a rotary evaporator and is added to water to precipitate a polymer that is extensively washed with water and then methanol. After vacuum drying, the yield of polymer is 4.6 grams.

EXAMPLE 8

A polymer with the structure

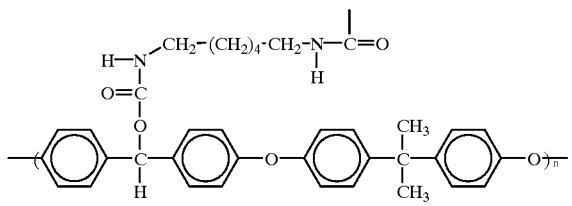

is made by adding hexane diisocyanate (0.1 gram, Aldrich) to the polyarylene ether alcohol (of the previous Example 7, 0.5 gram) in tetrahydrofuran (3.76 grams).

A photoreceptor charge transport layer is made by adding N,N'-diphenyl-N,N'-bis(3"-methylphenyl)-(1,1'-biphenyl)-4,4'-diamine) (0.5 gram) to the solution. When coated on hydroxygallium binder generator layer at 21 microns and tested on a flat plate xerographic scanner, the initial voltage (Vo) is 1000 volts, the dark decay is 80 volts, and the residual voltage after light exposure is 40 volts.

EXAMPLE 9

Chloromethylation of Poly(4-CPK-BPA)

A polymer with the structure

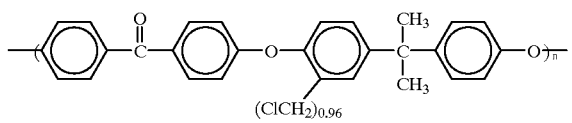

is made as follows. To a 5-liter 3-neck round-bottom flask equipped with a mechanical stirrer, reflux condenser, argon inlet and stopper that is situated in an ice bath are added sequentially, acetyl chloride (184 grams), dimethoxymethane (225 milliliters, 193 grams), methanol (6.25 milliliters), methylene chloride (500 milliliters), and poly(4-CPK-BPA) (75 grams, see Example 6 above) in methylene chloride (625 milliliters). To this is added tin tetrachloride (6.5 milliliters) via an air-tight syringe. The reaction mixture is heated for 4 hours at 55° C. oil bath set temperature. After cooling to 25° C., the reaction mixture is added to methanol to reprecipitate the polymer with 0.96 chloromethyl groups per repeat unit.

EXAMPLE 10

A polymer with the structure

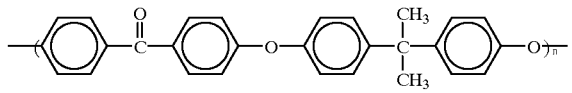

is made as follows. A 500-milliliter, 3-neck round-bottom flask equipped with a Dean-Stark trap (Barrett trap), condenser, mechanical stirrer, argon inlet, and stopper is situated in a silicone oil bath. 4,4'-difluorobenzophenone (Aldrich Chemical Co., Milwaukee, Wis., 21.82 grams), bisphenol A (Aldrich, 22.64 grams), potassium carbonate (40 -rams), anhydrous N,N-dimethylacetamide (300 milliliters), and toluene (52 milliliters) are added to the flask and heated to 175° C. (oil bath temperature) while the volatile toluene component is collected and removed. After 5 hours of heating at 175° C. with continuous stirring, phenol (5 grams) is added and the reaction mixture is heated and stirred at 175° C. for 30 more minutes. The reaction mixture is allowed to cool to 25° C. The solidified mass is extracted with methylene chloride (500 milliliters) and filtered to remove insoluble salts. The solution is concentrated using a rotary evaporator and then is added to methanol to precipitate the polymer. The polymer is isolated by filtration, washed with water and then methanol, and then is vacuum dried. The yield of vacuum dried product, poly(4-FPK-BPA), is 35 grams.

EXAMPLE 11

Chloromethylation of Poly(4-FPK-BPA)

A polymer with the structure

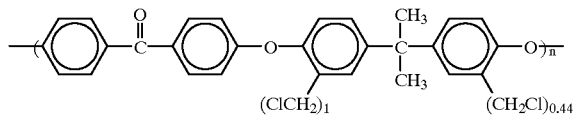

is made as follows. To a 1-liter 3-neck round-bottom flask equipped with a mechanical stirrer, reflux condenser, argon inlet and stopper that is situated in a silicone oil bath are added sequentially, acetyl chloride (140.1 grams, 128 milliliters), dimethoxymethane (157.6 grams), methanol (5 milliliters), tetrachloroethane (500 milliliters), and poly(4-FPK-BPA) (40 grams, made as described in Example 10) in tetrachloroethane (500 milliliters). To this is added tin tetrachloride (0.6 milliliter) via an air-tight syringe. The reaction mixture is heated for 2 hours at between 110° C. oil bath set temperature. After cooling to 25° C., the reaction mixture is added to methanol to reprecipitate the polymer with 1.44 chloromethyl groups per repeat unit.

EXAMPLE 12

A polymer with the structure

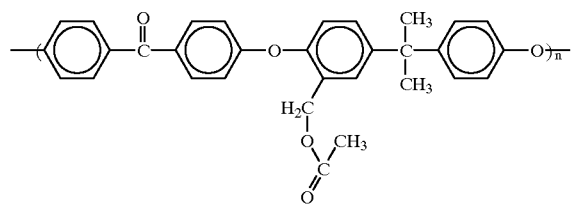

is made as follows. The chloromethylated polymer (Example 9, 15 grams) in N,N-dimethylacetamide (300 milliliters) is magnetically stirred with sodium acetate (Aldrich, 9 grams) for one month. The reaction mixture is centrifuged, and the reaction solution is decanted off from residual salts. The solution is added to water to precipitate a white polymer that is filtered, washed with water, then methanol, and then is vacuum dried.

EXAMPLE 13

A polymer with the structure

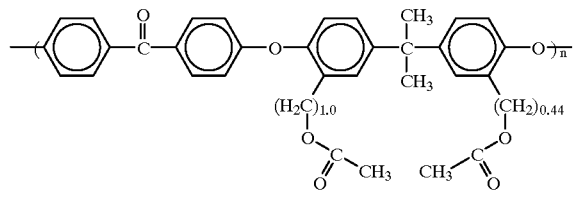

is made as follows. The chloromethylated polymer (1.44 $CH_2Cl$ groups per repeat unit, 15 grams, made following the procedure of Example 1 1) in N,N-dimethylacetamide (283 grams) is magnetically stirred with sodium acetate (Aldrich, 9 grams) for one month. The reaction mixture is centrifuged, and the reaction solution is decanted off from residual salts. The solution is added to water to precipitate a white polymer that is filtered, washed with water, then methanol, and then is vacuum dried. The polymer in methylene chloride is reprecipitated into methanol, is filtered, and then vacuum dried.

EXAMPLE 14

A polymer with the structure

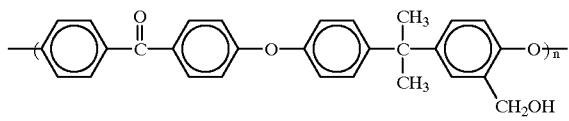

is made using the acetylated polymer of Example 12 (5 grams) in tetrahydrofuran (100 milliliters) to which was added 1 molar borane-tetrahydrofuran complex (125 milliliters). The mixture is boiled at reflux for 2 hours. Methanol is then cautiously added with gas evolution. Acetic acid (5 grams) is added and the resulting solution is added to water to precipitate the polymer product. The white polymer is filtered, washed with water, then with methanol, and then is vacuum dried.

EXAMPLE 15

A polymer with the sturcture

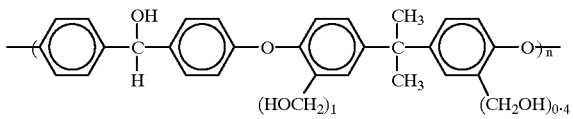

is made using the acetylated polymer (of the previous Example 13, 2 grams) in dioxane (50 milliliters) to which is added 1 molar borane-tetrahydrofuran complex (50 milliliters). The solution gels within 10 minutes at 25° C. The reaction mixture is heated at between 70–80° C. for 2 hours. Methanol is cautiously added with vigorous gas evolution, and the resultant solution is added to water to precipitate the polymer product. The white polymer is filtered, washed with water, then methanol, and then is vacuum dried.

The polymer (1 gram), N,N'-diphenyl-N,N'-bis(3"-methylphenyl)-(1,1'-biphenyl)-4,4'-diamine) (1 gram), and hexane diisocyanate (0.1 gram) in tetrahydrofuran (7 grams) is coated using an 8-mil gap Bird applicator on a photogenerator substrate, and the device is ramp dried at between 40 and 100° C. over 30 minutes.

The photogenerator substrate is prepared as follows. A siloxane coating of hydrolyzed gamma-aminopropyltriethoxysilane, in a 1:50 volume ratio of ethanol, is applied as a 1-mil wet film on a layer of vacuum deposited titanium on polyethylene terephthalate film. After heating at 135° C. for 10 minutes in a forced air oven, the siloxane coating has a dry thickness of 50 Angstroms. A second coating of an adhesive layer of polyester resin (Mor-Ester 49,000 obtained from Morton International) having a dry thickness of 50 Angstroms is formed as follows: 0.5 grams of 49,000 adhesive in 100 grams of methylene chloride is applied using a 1-mil gap Bird applicator to the siloxane layer. The film is then dried at 135° C. for 3 minutes. Thereafter, the adhesive layer is coated with a photogenerator layer containing 40 percent by volume hydroxygallium phthalocyanine and 60 percent by volume of a block copolymer of styrene (82 percent) and 4-vinylpyridine (18 percent) having a weight average molecular weight of 11,900. This photogenerator composition is prepared by dissolving 1.5 grams of the block copolymer of styrene/4-vinylpyridine in 42 milliliters of toluene. To this solution is added 1.33 grams of hydroxygallium phthalocyanine and 300 grams of 1/8-inch diameter stainless steel shot. This mixture is then placed on a roll mill for 20 hours. The resultant slurry is thereafter applied to the adhesive layer with a Bird applicator to form a layer having a wet thickness of 0.5 mil. This photogenerating layer is dried at 135° C. for 5 minutes in a forced air oven. The resultant photoreceptor device is evaluated using a xerographic flat plate test fixture. The initial charge on the photoreceptor is 800 volts, the dark decay is 100 volts, and the residual voltage after light exposure is 40 volts.

EXAMPLE 16

The polymers prepared in Examples 2, 5, 7, 14, and 15 (1.2 grams in each instance) are each roll milled in an amber glass bottle with tetrahydrofuran (7.5 grams in each instance) and N,N'-diphenyl-N,N'-bis(3"-methylphenyl)-(1,1'-biphenyl)-4,4'-diamine) (1.2 grams in each instance) (charge transport material, prepared as disclosed in U.S. Pat. No. 4,265,990, the disclosure of which is totally incorporated herein by reference). Hexane diisocyanate (at between 0.1 and 0.4 grams) is then added to each of the samples. For comparison purposes, a third transport material is prepared as disclosed except that instead of a polymer of the present invention, 1.2 grams of Makrolon® (polycarbonate resin with a molecular weight of from about 50,000 to about 100,000, obtained from Farbensabricken Bayer A. G.) is used with N,N'-diphenyl-N,N'-bis(3"-methylphenyl)-(1,1'-biphenyl)-4,4'-diamine) 1.2 grams) and methylene chloride (11.2 grams). The resultant solutions are each coated onto the photogenerator layers of imaging members comprising a 3 mil thick metallized polyethylene terephthalate substrate with a vacuum deposited titanium oxide coating about 200 Angstroms thick, a 3-aminopropyltriethoxysilane charge blocking layer 300 Angstroms thick, a polyester adhesive layer (49,000 adhesive obtained from E. I. DuPont de Nemours & Co., Wilmington, Del.) about 400 Angtroms thick, and a 0.5-micron thick photogenerating layer consisting of a photogenerating layer containing 40 percent by volume hydroxygallium phthalocyanine and 60 percent by volume of a block copolymer of styrene (82 percent)/4-vinyl pyridine (18 percent) having a Mw of 11,900. This photogenerating coating composition was prepared by dissolving 1.5 grams of the block copolymer of styrene/4-vinyl pyridine in 42 milliliters of toluene. To this solution is added 1.33 grams of hydroxygallium phthalocyanine and 300 grams of 1/8 inch diameter stainless steel shot. This mixture is then placed on a roll mill for 20 hours. The resulting slurry is thereafter applied to the adhesive layer with a Bird applicator to form a layer having a wet thickness of 0.5 mil. This photogenerating layer is dried at 135° C. for 5 minutes in a forced air oven to form a layer having a dry thickness of 0.25 micron.

Charge transport layers are then applied to the photogenerating layers thus prepared. Charge transport solutions are prepared in each instance by introducing into an amber glass bottle, 1.2 grams of N,N'-diphenyl-N,N'-bis(3"-methylphenyl)-(1,1'-biphenyl)-4,4'-diamine), 1.2 grams of the same polymer used as the binder in the photogenerating layer (i.e., one with the polymer of Example 2) in tetrahydrofuran (7.5 grams), respectively, and one with the Makrolon® polycarbonate (Bayer) and methylene chloride (11.2 grams), and admixing the contents to prepare the solution. Hexane diisocyanate is added to the Example 2 polymer solutions, 0.1, 0.2 and 0.4 grams, respectively. The charge transport solutions are applied to the photogenerator layers with an 8 mil gap Bird applicator to form a coating which is heated from 40 to 100° C. over 30 minutes to dry the layer. The charge transport layers thus applied to the imaging members have a dry coating thickness of about 21 microns.

The electrical properties of the imaging members thus prepared are measured with a xerographic testing scanner comprising a cylindrical aluminum drum having a diameter of 242.6 millimeters (9.55 inches) to evaluate photoelectrical integrity. The test samples are taped onto the drum. When rotated, the drum carrying the samples produced a constant surface speed of 76.3 centimeters (30 inches) per second. A direct current pin corotron, exposure light, erase light, and five electrometer probes are mounted around the periphery of the mounted photoreceptor samples. The sample charging time was 33 milliseconds. Both expose and erase lights are broad band white light (400–700 nanometer) outputs, each supplied by a 300 Watt output xenon arc lamp. The relative locations of the probes and lights are indicated in the table below:

TABLE 1

| Element | Angle (degrees) | Position (mm) | Distance from Photoreceptor (mm) |
|---|---|---|---|
| Charge | 0 | 0 | 18 pins |
|  |  |  | 12 shield |
| Probe 1 | 22.5 | 47.9 | 3.17 |
| Expose | 56.25 | 118.8 | N.A. |
| Probe 2 | 78.75 | 166.8 | 3.17 |
| Probe 3 | 168.75 | 356.0 | 3.17 |
| Probe 4 | 236.25 | 489.0 | 3.17 |
| Erase | 258.75 | 548.0 | 125.00 |
| Probe 5 | 303.75 | 642.9 | 3.17 |

The imaging members prepared as described with the polymer prepared in Example 2 and the control Makrolon® polycarbonate binder resin are mounted on a cylindrical aluminum drum which is rotated on a shaft. The films are charged by a corotron mounted along the circumference of the drum. The surface potentials are measured as a function of time by several capacitively coupled probes placed at different locations around the shaft. The probes are calibrated by applying known potentials to the drum substrate. The films on the drum are then exposed and erased by light sources located at appropriate positions around the drum. The measurement consisted of charging the photoconductor devices in a constant current or voltage mode. As the drum rotates, the initial charging potential is measured by probe 1. Further rotation led to the exposure station, where the photoconductor devices are exposed to monochromatic radiation of known intensity. The surface potential after exposure is measured by probes 2 and 3. The devices are finally exposed to an erase lamp of appropriate intensity and any residual potential is measured by probe 4. The process is repeated with the magnitude of the exposure automatically changed during the next cycle.

A photo-induced discharge characteristics curve is obtained by plotting the potentials at probes 2 and 3 as a function of exposure. The test samples are first rested in the dark for at least 60 minutes to ensure achievement of equilibrium with the testing conditions of 21.1° C. and 40.0 percent relative humidity. Each sample is then negatively charged in the dark to a development potential of about 900 volts. The charge acceptance of each sample and its residual potential after discharge by front erase exposure to 400 ergs per square centimeter are recorded. The test procedure is repeated to determine the photoinduced discharge characteristic of each sample (PIDC) by different light energies of up to 20 ergs per square centimeter. Process speed is 60.0 imaging cycles per minute. The initial slope of the discharge curve is termed S in units of (volts x $cm^2$/ergs) and the residual potential after the erase step is termed Vr. The devices are cycled continuously for 10,000 cycles of charge, expose, and erase steps to determine the cyclic stability. Charge trapping in the transport layer results in a build up of residual potential known as cycle-up. The sensitivity data and the residual cycle-up for the samples is shown in the Table below. S represents the initial slope of the Photo-Induced Discharge Characteristics (PIDC) and is a measure of the sensitivity of the device. Cycle-up is the increase in residual potential in volts after 10,000 cycles of continuous operation. The negative numbers of the residual cycle-up resulted from an increase in sensitivity of the pigment in the generator layer as the device is cycled. The numbers indicate that the transport layers of N,N'-diphenyl-N,N'-bis(3"-methylphenyl)-(1,1'-biphenyl)-4,4'-diamine) dispersed in the binders of the present invention are trap free. The absence of traps suggest that the diamine dispersed well in all three of these binders. Results are summarized in the following table. Film peel strength and mechanical properties of the layers containing the polymers of the present invention are good as determined by manual manipulations.

TABLE 2

Electrical Properties of Charge Transport Layers Made with Hydroxy-Containing Polymers and N,N'-diphenyl-N,N'-bis(3"-methylphenyl)-(1,1'-biphenyl)-4,4'-diamine) on Hydroxygallium Phthalocyanine Photogenerator Layers

| Binder Polymer | S, volts x $cm^2$/ergs | PIDC Vr, volts | 1 sec Dark Decay, v/sec | Cyclic Characteristics, 10K Cycle-up | Vo |
|---|---|---|---|---|---|
| Example 1 (THF) | 227 | 108 | 47 | 330 | 799 |
| Example 1 ($CH_2Cl_2$) | 240 | 33 | 109 | 17 | 804 |
| Example 1 (THF) | 233 | 230 | 30 | 41 | 796 |
| Example 1 ($CH_2Cl_2$) | 226 | 79 | 74 | −89 | 799 |
| Example 1 ($CH_2Cl_2$) | 213 | 45 | 48 | −39 | 801 |
| Example 1 (THF) + HDI(0.1) | 202 | 83 | 53 | −10 | 804 |
| Example 2 (THF) | 209 | 47 | 42 | −3 | 599 |
| Example 2 (THF) | 252 | 234 | 29 | 266 | 797 |
| Example 2 (THF) | 285 | 98 | 93 | 171 | 799 |
| Example 2 (THF) + HDI(0.1) | 271 | 37 | 62 | 12 | 800 |
| Example 2 (THF) + HDI(0.2) | 255 | 27 | 58 | −4 | 800 |
| Example 2 (THF) + HDI(0.4) | 240 | 31 | 56 | −18 | 802 |
| Example 2 (THF) + HDI(0.1) | 289 | 5 | 85 | 7 | 797 |
| Example 2 (THF) + HDI(0.2) | 343 | 13 | 133 | −10 | 595 |
| Example 19 (TBD/Makrolon) | 314 | 29 | 63 | 11 | 801 |

From these results, it is concluded that crosslinked charge transport layers are made with high hole mobility, good PIDC photoelectrical properties, and low Vr by reacting polyarylene ether alcohols with polyisocyanates. The binder resin is compatible with mTBD and is soluble in tetrahydrofuran (THF) and monochlorobenzene (mCB), the usual OPC coating solvents. The formulation with diisocyanate crosslinking agent (hexane diisocyanate) has a reasonable potlife that is in excess of 2 weeks at 25° C.

EXAMPLE 17

Four additional photoreceptor samples are made and evaluated in which the polymer of Example 2 (1.2 grams), N,N'-diphenyl-N,N'-bis(3"-methylphenyl)-(1,1'-biphenyl)-4,4'-diamine) (1.2 grams) and tetrahydrofuran (7.5 grams) are combined with hexane diisocyanate as the charge transfer layer. The solutions are coated on hydroxygallium phthalocyanine photogenerator substrates prepared as described above on metallized polyethylene terephthalate, with a siloxane blocking layer and a 49,000 adhesive layer. The charge transfer layers are coated on the photogenerator layer with an 8-mil gap Bird applicator and then were dried at between 40 and 80° C. over 30 minutes. Sample A has 0.1 gram of hexane diisocyanate added. Sample B has 0.19 gram of hexane diisocyanate added, and Sample C has 0.38 gram of hexane diisocyante added. These samples were compared to a control sample made with Makrolon® polycarbonate (1.2 grams), N,N'-diphenyl-N,N'-bis(3"-methylphenyl)-(1,1'-biphenyl)-4,4'-diamine) (1.2 grams), and methylene chloride (11.2 grams) coated on the hydroxygallium phthalocyanine photogenerator layer and dried under the same conditions.

Figure 2:
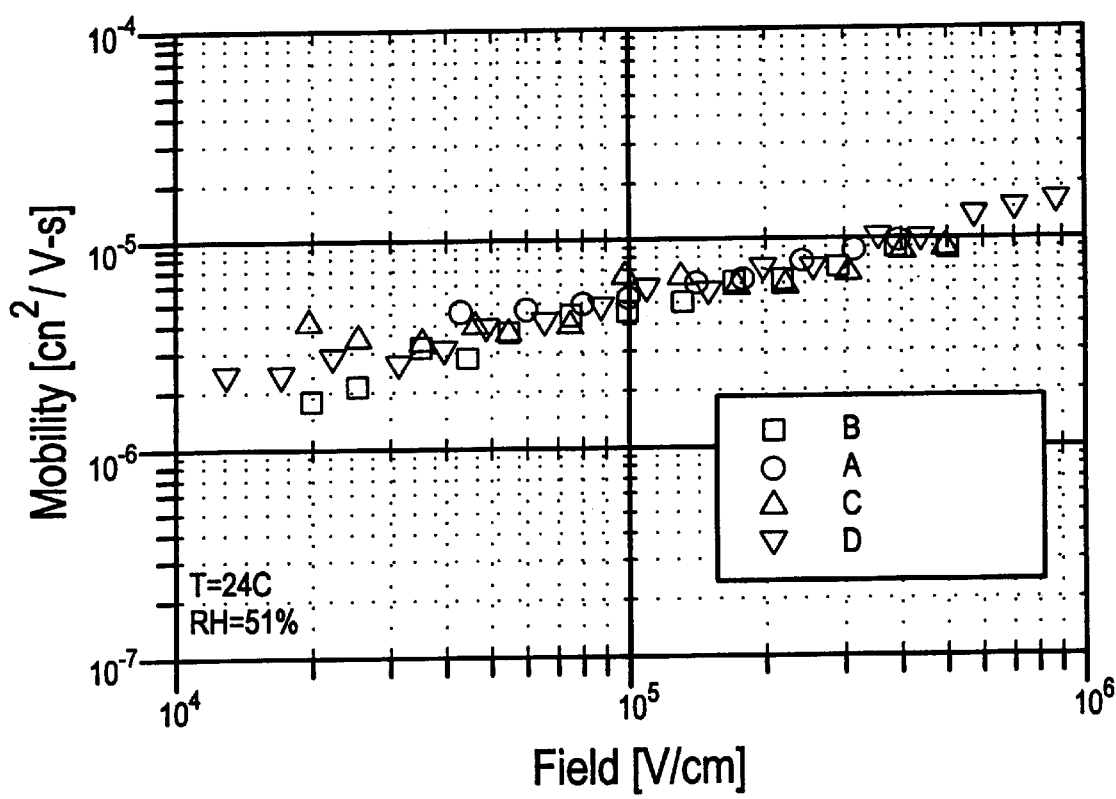
FIG. 2 is a chart of the charge mobilities as a function of field of the photoconductors of the invention compared against a photoconductor containing a conventional polycarbonate charge transport layer.
Figure 3:
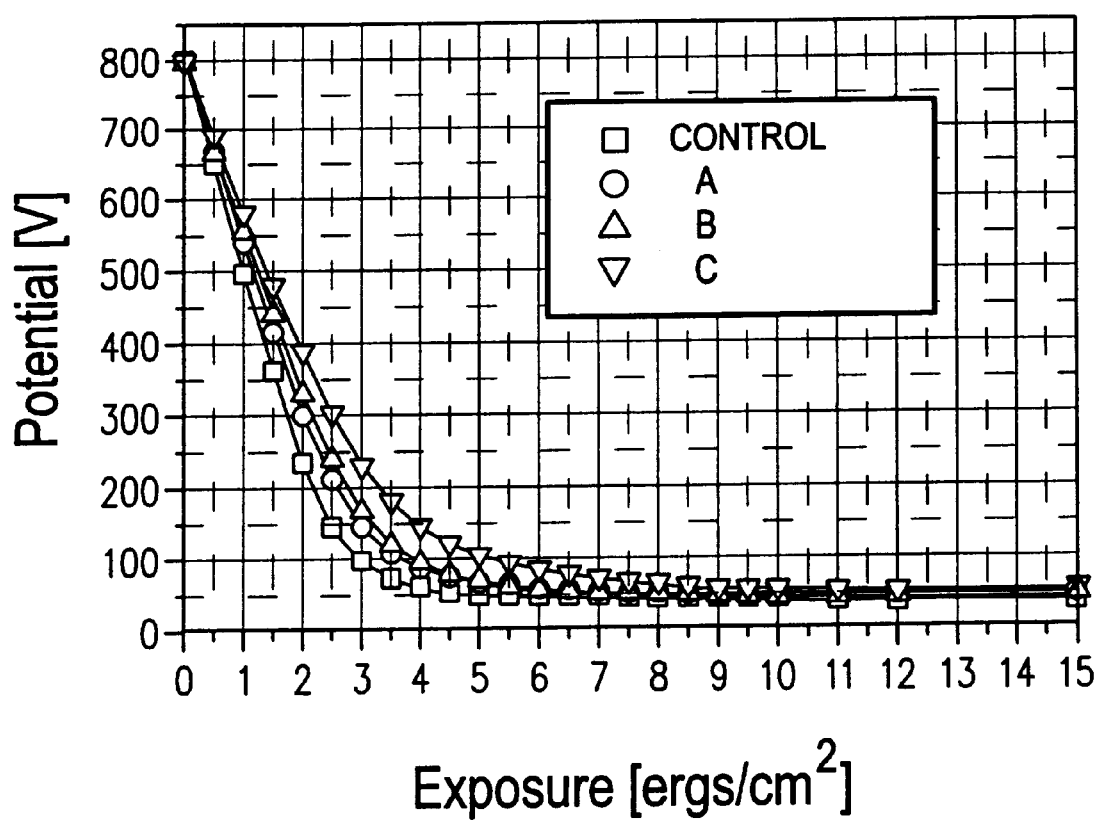
FIGS. 3 and 4 are photodischarge decay curves (PIDC's) of photoconductors of the invention.

Table 3 and FIGS. 1 to 3 summarize the electrical results for hand coated samples on flexible substrates with hydroxygallium phthalocyanine photogenerator in PSVP binder. The mobilities are very close to those in mTBD in polycarbonate (FIG. 2) and are of sufficient magnitude down to small fields which ensures rapid transit times. The PIDC's soften with increasing hexane diisocyanate (HDI) content. Some of the softening should disappear if the thicknesses of the devices that contain the new transport layer are scaled to the control device thickness (see current-voltage IV slope in Table 1; thicknesses are around 21 μm instead of 25 to 28μm). The different solvent system may also have promoted this tendency of PIDC softening. Other electrical properties are close to or as good as those of the control device. The only parameter that deviates significantly is the cycle-down. However, it should be noted that (1) the new devices start with significantly lower dark decay than the control device (around 40V vs. 70V for 0.6 s dark decay (the dark decay values in the cycling experiments are not normalized); and (2) most of the cycle-down occurs at the beginning and seems to saturate at higher cycle numbers, e.g., for Sample A the dark decay is 48, 64, 74, 94, 94, and 90V after 400, 2,400, 4,000, 6,000, 8,000, and 10,000 of charge, expose, and erase cycles, respectively.

In summary, the new transport layers affect very little the underlying generation layer and are at least two orders faster than other crosslinked transport layer systems.

TABLE 3

| | Devices | | | |
| --- | --- | --- | --- | --- |
| | Control | A | B | C |
| Sensitivity | 314 | 271 | 255 | 240 |
| Expos. 3.8 ergs/cm² (V) | 68 | 95 | 103 | 159 |
| Expos. 6 ergs/cm² (V) | 46 | 59 | 55 | 85 |
| Dark Decay (1s) (V) | 63 | 62 | 58 | 56 |
| Depletion (@ 10k) (V) | 38 | 6 | 1 | 8 |
| IV Slope | 56 | 43 | 40 | 41 |
| Cycle-up (10k) (V) | 9 | 25 | 4 | −5 |
| Cycle-down (10k) (V) | −16 | 41 | 49 | 62 |

The photoreceptor properties of sensitivity, exposure, dark decay, depletion, current-voltage (IV) slope, cycle-up and cycle-down are all determined with the apparatus described above. These eight properties summarized in Table 3 are correspondingly graphed in the star plot of FIG. 1. The star plot allows all eight photoreceptor properties of the photoreceptors to be visualized at once, and at the same time compared with those of the control. In FIG. 2, the charge mobilities of samples A–C as a function of field are plotted. In FIG. 2, samples A–C are compared against a comparative sample D in which the charge transport layer comprises mTBD in a Makrolon polycarbonate binder. As can be seen by the results in FIG. 2, the mobilities of the HDI modified-polyarylene ether alcohol samples are very close to that achieved by mTBD in polycarbonate and are of sufficient magnitude down to small fields to ensure rapid transit times.

FIG. 3 summarizes the photodischarge decay curves (PIDC) for samples A–C compared against the control. The PIDCs soften with increasing hexane diisocyanate content.

Overall, the results demonstrate that the electrical properties of the charge transport layer of the invention are close to or as good as those of conventional charge transport layers employing polycarbonate binders. The charge transport layers of the present invention, however, achieve much superior wear resistance compared to such conventional charge transport layers.

EXAMPLE 18

Organic Photoreceptor Drum Preparation

Four electrophotographic imaging members are prepared by applying by dip coating a charge blocking layer onto the rough surface of aluminum drums having a diameter of 4 cm and a length of 31 cm. The blocking layer coating mixture is a solution of 8 weight percent polyamide (Nylon 6) dissolved in 92 weight percent butanol, methanol and water solvent mixture. The butanol, methanol and water mixture percentages are 55, 36 and 9 percent by weight, respectively. The coating is applied at a coating bath withdrawal rate of 300 mm/minute. After drying in a forced air oven, the blocking layers have thicknesses of 1.5 micrometers.

The dried blocking layers are coated with a charge generating layer containing 2.5 weight percent chlorogallium phthalocyanine pigment particles, 2.5 weight percent polyvinylbutyral film fonning polymer and 95 weight percent cyclohexanone solvent. The coatings are applied at a coating bath withdrawal rate of 300 mm/minute. After drying in a forced air oven, the charge generating layers have thicknesses of 0.2 micrometer.

Figure 4:
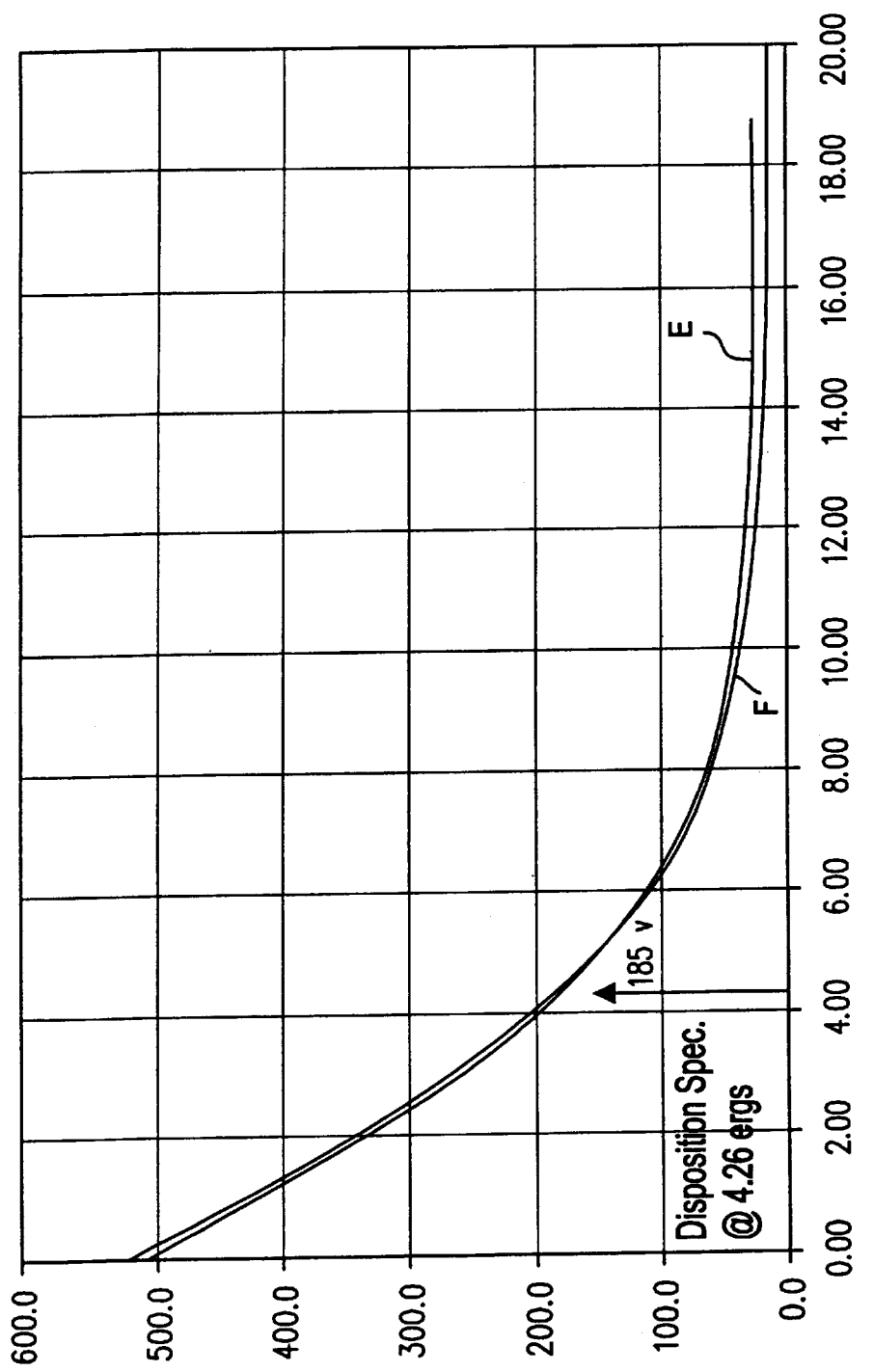

A control drum is subsequently coated with a charge transport layer containing N,N'-diphenyl-N,N'-bis(3-methylphenyl)-1,1;-biphenyl-4,4'-diamine dispersed in polycarbonate (PCZ300, available from the Mitsubishi Chemical Company). The coating mixture consists of 8 weight percent N,N'-diphenyl-N,N'-bis(3-methylphenyl)-1,1'-biphenyl-4,4;-diamine, 12 weight percent binder and 60 weight percent tetrahydrofuran, and 20 weight percent monochlorobenzene solvent. Alternatively, sample drums are made by coating the photogenerator layer with a charge transport layer consisting of the polymer of Example 2 (4.7 grams), N,N'-diphenyl-N,N'-bis(3-methylphenyl)-1,1'-biphenyl-4,4;-diamine (4.7 grams), and 33.3 grams of tetrahydrofuran solvent. Hexane diisocyanate is added in the following proportions: 0.39 grams, 0.82 grams, and 3.9 grams respectively. The coatings are applied in a Tsukiage dip coating apparatus. After drying in a forced air oven for 45 minutes at 118° C., the transport layers have thicknesses of 21 micrometers. In FIG. 4, PIDC curves are further provided for sample E of the invention (containing 3.9 g hexane diisocyanate) and sample F (containing 0.41 g hexane diisocyanate.

The electrical properties (PIDC curves) for these drums are very good. The binder resin is compatible with mTBD and is soluble in tetrahydrofuran (THF) and monochlorobenzene (mCB), the usual OPC coating solvents. The formulations with the diisocyanate crosslinking agent (hexane diisocyanate) have a reasonable potlife that is in excess of 2 weeks at 25° C. Hodaka OPC drums are Tsukiage coated with the crosslinkable CTL at about 21 microns with the above recipes.

The best drum for wear resistance is Sample F which shows a 2 times improvement in wear to a bias charging roll. The wear rate of the OPC drum with 3.9 g hexane diisocyanate was 5.5 micometers/100 per 100 kilocycles. This corresponds to a BCR wear life at the standard 25 micron CTL thickness of (25−12)(100Kcycles)/5.5=240 kilocycles or 330 kilocycles for a 30 microns CTL device. Moreover, there is the possibility of coating the crosslinked CTL even thicker because the crosslinked CTL does not redissolve in successive dips.

What is claimed is:

1. A crosslinkable charge transport layer material for a photoconductor comprising at least one poly(arylene ether alcohol), at least one polyisocyanate crosslinking agent and at least one charge transport material dispersed in a solvent.

2. The crosslinkable charge transport layer material according to claim 1, wherein the at least one poly(arylene ether alcohol) comprises

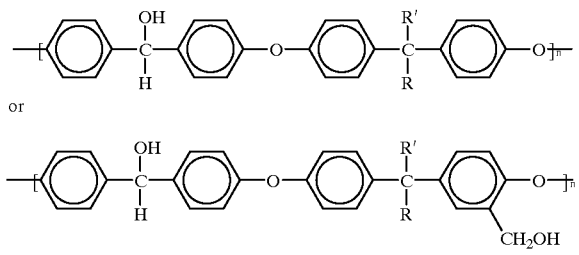

where R and R' may be the same or different and represent H (hydrogen), $CH_3$ (methyl), $CF_3$, ethyl, propyl, fluorenoyl or cyclohexyl, and n may be any integer ranging from 25 to 2500.

3. The crosslinkable charge transport layer material according to claim 1, wherein the at least one polyisocyanate crosslinking agent comprises hexane diisocyanate, toluene diisocyanate, diphenylmethane diisocyanate, isophorone diisocyanate, or adducts of trimethylolpropane with toluene diisocyanate.

4. The crosslinkable charge transport layer material according to claim 3, wherein the at least one polyisocyanate crosslinking agent is hexane diisocyanate.

5. The crosslinkable charge transport layer material according to claim 1, wherein the solvent is tetrahydrofuran or a mixture of tetrahydrofuran and monochlorobenzene.

6. The crosslinkable charge transport layer material according to claim 1, wherein the at least one polyisocyanate crosslinking agent is present in the charge transport layer material in an amount of from 5 to 85 weight % of an amount of the at least one poly(arylene ether alcohol) present in the charge transport layer material.

7. The crosslinkable charge transport layer material according to claim 1, wherein the charge transport layer material is crosslinked following application to the photo conductor.

8. A charge transport layer of a photoconductor comprising
a binder comprised of at least one poly(arylene ether alcohol) crosslinked with at least one polyisocyanate crosslinking agent, and
at least one charge transport material in the binder.

9. The charge transport layer according to claim 8, wherein the at least one poly(arylene ether alcohol) comprises

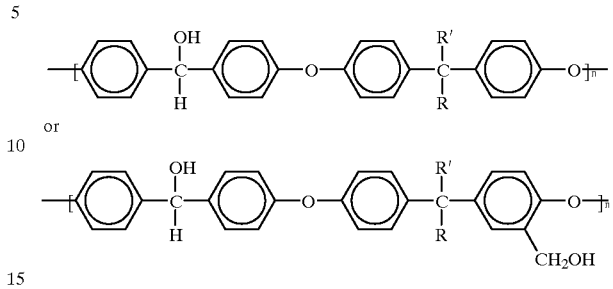

where R and R' may be the same or different and represent H (hydrogen), $CH_3$ (methyl), $CF_3$, ethyl, propyl, fluorenoyl or cyclohexyl, and n may be any integer ranging from 25 to 2500.

10. The charge transport layer according to claim 8, wherein the at least one polyisocyanate crosslinking agent comprises hexane diisocyanate, toluene diisocyanate, diphenylmethane diisocyanate, isophorone diisocyanate, or adducts of trimethylolpropane with toluene diisocyanate.

11. The charge transport layer according to claim 10, wherein the at least one polyisocyanate crosslinking agent is hexane diisocyanate.

12. The charge transport layer according to claim 8, wherein the charge transport layer has a bias charging roll wear rate of less than 6 microns per 100 kilocycles.

13. A photoconductor comprising
an optional anti-curl layer,
a substrate,
an optional hole blocking layer,
an optional adhesive layer,
a charge generating layer,
a charge transport layer comprising a binder comprised of
at least one poly(arylene ether alcohol) crosslinked with at least one polyisocyanate crosslinking agent, and
at least one charge transport material in the binder, and
an optional overcoat layer.

14. The photoconductor according to claim 13, wherein the at least one poly(arylene ether alcohol) comprises

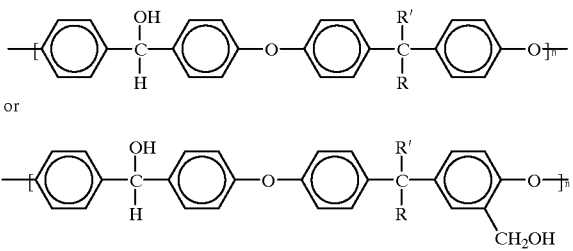

where R and R' may be the same or different and represent H (hydrogen), $CH_3$ (methyl), $CF_3$, ethyl, propyl, fluorenoyl or cyclohexyl, and n may be any integer ranging from 25 to 2500.

15. The photoconductor according to claim 13, wherein the at least one polyisocyanate crosslinking agent comprises hexane diisocyanate, toluene diisocyanate, diphenylmethane diisocyanate, isophorone diisocyanate, or adducts of trimethylolpropane with toluene diisocyanate.

16. The photoconductor according to claim 15, wherein the at least one polyisocyanate crosslinking agent is hexane diisocyanate.

17. The photoconductor according to claim 13, wherein the charge generating layer comprises hydroxygallium phthalocyanine pigment in a polystyrene/polyvinyl pyridine copolymer binder.

18. The photoconductor according to claim 13, wherein the optional overcoat layer is present and comprises a material derived from methoxymethyl-substituted polyamide crosslinked with oxalic acid.

19. The photoconductor according to claim 13, wherein the photoconductor has a form of a drum.

20. An image forming device comprising the photoconductor of claim 13.

* * * * *